(12) United States Patent
Zhang et al.

(10) Patent No.: US 9,149,890 B2
(45) Date of Patent: Oct. 6, 2015

(54) LASER PUNCHER FOR PUNCHING HOLE ON TIPPING PAPER IN A CURVED MANNER

(75) Inventors: Xiangming Zhang, Wuhan (CN); Feixing Lu, Wuhan (CN); Dayong Min, Wuhan (CN)

(73) Assignee: Wuhan Huagong Laser Engineering Co., LTD, Wuhan (CN)

( * ) Notice: Subject to any disclaimer, the term of this patent is extended or adjusted under 35 U.S.C. 154(b) by 270 days.

(21) Appl. No.: 13/641,355

(22) PCT Filed: Feb. 15, 2011

(86) PCT No.: PCT/CN2011/070982
§ 371 (c)(1),
(2), (4) Date: Oct. 15, 2012

(87) PCT Pub. No.: WO2012/037789
PCT Pub. Date: Mar. 29, 2012

(65) Prior Publication Data
US 2013/0193120 A1    Aug. 1, 2013

(30) Foreign Application Priority Data
Sep. 26, 2010    (CN) .......................... 2010 1 0291948

(51) Int. Cl.
*B23K 26/00*    (2014.01)
*B23K 26/38*    (2014.01)
*B23K 26/08*    (2014.01)
*B23K 26/40*    (2014.01)
*B23K 26/06*    (2014.01)

(52) U.S. Cl.
CPC ............... *B23K 26/381* (2013.01); *B23K 26/06* (2013.01); *B23K 26/08* (2013.01); *B23K 26/0807* (2013.01); *B23K 26/383* (2013.01); *B23K 26/406* (2013.01)

(58) Field of Classification Search
CPC .... B23K 26/06; B23K 26/08; B23K 26/0807; B23K 26/381; B23K 26/383
USPC ......................................... 219/121.6–121.83
See application file for complete search history.

(56) References Cited

U.S. PATENT DOCUMENTS 6,080,956 A *   6/2000   Ueda et al. ............... 219/121.63

FOREIGN PATENT DOCUMENTS

JP    63-093493    *   4/1988

* cited by examiner

*Primary Examiner* — Sang Y Paik
(74) *Attorney, Agent, or Firm* — Martensen IP

(57) ABSTRACT

A laser puncher for punching holes on tipping paper, comprises a panel, a light guiding cylinder, a laser connected with the light guiding cylinder, and a transmission system for driving a piece of tipping paper to move in a curved manner. The laser puncher further includes at least one focusing optical head, at least one driving motor fixed on the panel, and a connecting rod fixedly connected with at least one moving optical cylinder. The moving optical cylinder is associated with the light guiding cylinder that penetrates the panel and is connected with the focusing optical head. The driving motor drives the focusing optical head to reciprocate back and forth via the connecting rod and the moving optical cylinder.

5 Claims, 2 Drawing Sheets

(a)

(b)

(c)

(d)

LASER PUNCHER FOR PUNCHING HOLE ON TIPPING PAPER IN A CURVED MANNER

RELATED APPLICATION

The present application relates to and claims the benefit of priority Patent Cooperation Treaty (PCT) Patent Application No. PCT/CN2011/070982 filed 15 Feb. 2011, which is hereby incorporated by reference in its entirety for all purposes as if fully set forth herein.

BACKGROUND OF THE INVENTION

1. Field of the Invention

The present invention relates to a laser puncher and particularly to a laser puncher capable of punching holes on a piece of tipping paper in a curve manner.

2. Relevant Background

Tipping paper, a kind of decorative paper that is produced by printing base paper and widely used in modern industry, is a cigarette wrapping material dedicated to the packaging of the filter tip of a cigarette, belonging to a special kind of industrial paper. In order to reduce tar content, tipping paper manufacturers employ a laser puncher to punch holes on tipping papers; however, as the focusing optical head of existing laser puncher is fixedly installed, the one or more rows of hole lines formed on a piece of tipping paper are all linearly arranged. As a consequence, the tipping papers produced by different manufacturers are all similar and are therefore difficult to be distinguished.

SUMMARY OF THE INVENTION

In view of the problem above, it is the main object of the present invention to provide a laser puncher capable of punching holes on tipping paper in a curved manner. In order to achieve the purpose above, there is provided a laser puncher for punching holes on tipping paper in a curved manner that comprises a panel, a light guiding cylinder, a laser connected with the light guiding cylinder, a transmission system driving a piece of tipping paper to move and at least one focusing optical head and is characterized in that at least one driving motor is fixed on the panel, a screw shaft is connected with the driving shaft of the driving motor, a nut is connected with the screw shaft and fixedly connected with a connecting rod, the other end of which is fixedly connected with at least one moving optical cylinder, one end of which is provided with the light guiding cylinder, and the other end of which penetrates the panel to be fixedly connected with the focusing optical head, the external periphery of the moving optical cylinder is provided with an anti-rotation linear bearing, which is fixed on the panel, and the driving motor drives the focusing optical head to reciprocate back and forth via the screw shaft, the nut, the connecting rod and the moving optical cylinder.

There are a plurality of driving motors and a plurality of focusing optical heads, each of which is driven by a driving motor to reciprocate back and forth. There are a plurality of driving motors and a plurality of focusing optical heads, and each driving motor synchronously drives several focusing optical heads to reciprocate back and forth.

According to one embodiment of the present invention the driving motor preferably refers to a servo motor or a stepper motor.

According to one embodiment of the present invention the laser preferably refers to a $CO_2$ laser.

The laser puncher provided herein is simply structured and easily produced and capable of increasing the identifiability (that is, anti-counterfeiting effect) of tipping papers on which holes are punched with a laser puncher, the air permeability of tipping papers as well as working efficiency.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In order to make the structure of the present invention and the effect achieved understood better, the present invention is described below in detail by reference to preferred embodiments when taken in conjunction with accompanying drawings.

Figure 1:
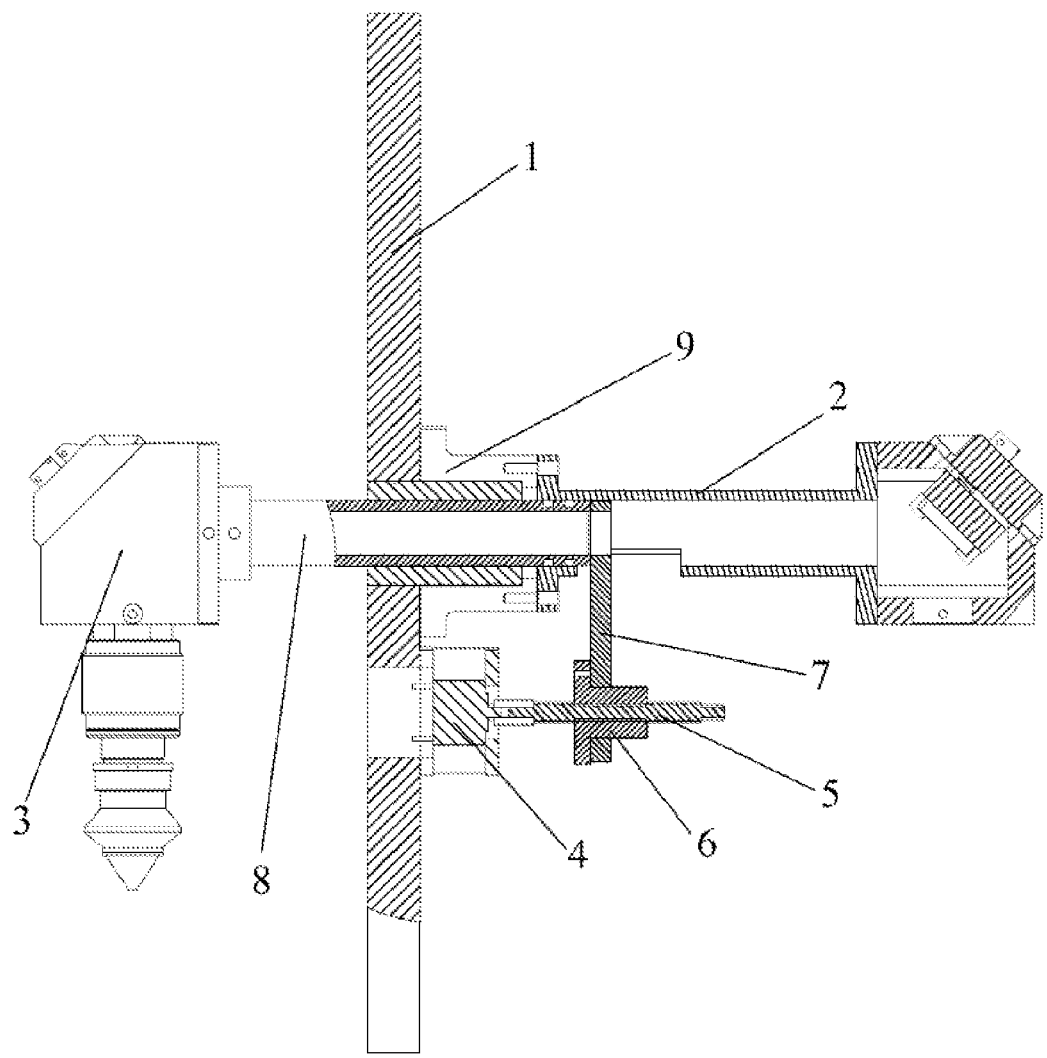
FIG. 1 is a local sectional view of the laser puncher provided herein for punching holes on a piece of tipping paper in a curved manner.

As shown in FIG. 1, the laser puncher provided herein for punching holes on tipping paper in a curve manner comprises a panel 1, a light guiding cylinder 2, a laser (not shown) connected with the light guiding cylinder 2, a transmission system (not shown) for driving a piece of tipping paper to move and at least one focusing optical head 3; at least one driving motor 4 is fixed on the panel 1, a screw shaft 5 is connected with the driving shaft of the driving motor 4, a nut 6 is connected with the screw shaft 5 and fixedly connected with a connecting rod 7, the other end of which is fixedly connected with at least one moving optical cylinder 8, one end of which is provided with the light guiding cylinder 2, and the other end of which penetrates the panel 1 to be fixedly connected with the focusing optical head 3, and the external periphery of the moving optical cylinder 8 is provided with an anti-rotation linear bearing 9, which is fixed on the panel 1.

When the driving motor 4 rotates clockwise and anti-clockwise at a certain angle, the driving shaft of the driving motor 4 drives the screw shaft 5 to reciprocate back and forth by means of its relative movement with respect to the screw shaft 5, the screw shaft 5 drives the moving optical cylinder 8 to reciprocate back and forth in the anti-rotation linear bearing 9 by means of the transmission between the nut 6 connected with the screw shaft 5 and the connecting rod 7, and the focusing optical head 3 also consequentially reciprocates back and forth under the drive of the moving optical cylinder 8.

The laser beam emitted from the laser is subjected to a series of orientation and processing and then arrives at the focusing optical head 3; in the case where only one focusing optical head 3 is designed to reciprocate back and forth, focused pulse light is guided onto a piece of tipping paper that moves at uniform speed under the drive the transmission system, and then a hole curve substantially in sine curve shape is formed on the piece of tipping paper; in the case where a plurality of focusing optical heads 3 are designed to reciprocate back and forth, a plurality of hole curves substantially in sine curve shape are formed on the piece of tipping paper.

In the present invention, there may be a plurality of focusing optical heads 3 and a plurality of driving motors 4; the focusing optical heads 3 are in a one-to-one or multi-to-one correspondence relationship with the driving motors 4, that is, each driving motor 4 drives one or more focusing optical heads 3 to reciprocate back and forth. As shown in FIG. 2(a), only one focusing optical head 3 is employed in the present invention, the focused pulse light is guided onto a piece of tipping paper moving at uniform speed, and then a hole curve substantially in sine curve shape is formed on the piece of tipping paper.

As shown in FIG. 2(b), two focusing optical heads 3 are employed in the present invention which are arranged on a line parallel to the movement track of a piece of tipping paper at a certain interval and move synchronously in the same direction at the same movement frequency and amplitude under the drive of the same driving motor 4 or different driving motors 4, consequentially, two identical staggered hole curves, which are both in sine curve shape but spaced by a certain phase difference, are formed on the piece of tipping paper.

As shown in FIG. 2(c), two focusing optical heads 3 are employed in the present invention which are arranged on a line vertical to the movement track of a piece of tipping paper at a certain interval and move synchronously in the same direction at the same movement frequency and amplitude under the drive of the same driving motor 4 or different driving motors 4, consequentially, two parallel rows of identical hole curves in sine curve shape are formed on the piece of tipping paper, with their horizontal axes spaced by a certain distance.

Figure 2:
FIG. 2 (a)-FIG. 2 (d) are schematic diagrams showing the punching effect of the laser puncher provided herein for punching holes on a piece of tipping paper in a curved manner.
Figure 2:
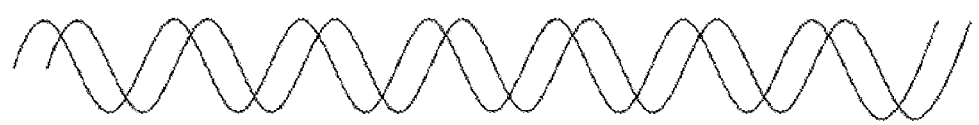
Figure 2:
Figure 2:
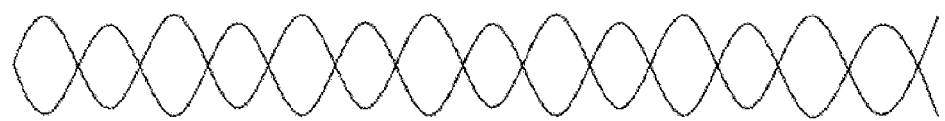

As shown in FIG. 2(d), two focusing optical heads 3 are employed in the present invention which are arranged on a line parallel to the movement track of a piece of tipping paper at a certain interval; when moving synchronously in the same direction, the two focusing optical heads 3 can be synchronously driven by the same driving motor 4 or different driving motors 4; when moving synchronously in opposite directions, the two focusing optical heads 3 are driven by different moving motors 4 and move different distances at the same movement frequency, and the forward amplitude and the backward amplitude of one of the two focusing optical heads 3 are respectively equal to the backward amplitude and the forward amplitude of the other one, therefore, two identical staggered hole curves are formed on the piece of tipping paper which are alternated in amplitude vertex. Although two focusing optical heads 3 are employed in embodiments shown in FIG. 2(b), FIG. 2 (c) and FIG. 2 (d), it should be understood that three or more focusing optical heads 3 can also be employed herein. By adjusting the rotation speed of the driving motor 4, the reciprocating frequency of the focusing optical head 3 can be adjusted to adjust the frequency of a sine curve formed by the laser holes on a piece of tipping paper; and by adjusting the revolutions of the driving motor 4, the reciprocating distance of the focusing optical head 3 can be adjusted to adjust the amplitude of a sine curve formed by the laser holes on a piece of tipping paper.

In the present invention, the driving motor 4 refers to a servo motor or a stepper motor, and the laser refers to a CO2 laser. The laser puncher provided herein is simply structured and easily produced and capable of increasing the identifiability (that is, anti-fake effect) of tipping papers on which holes are punched with a laser puncher, the air permeability of tipping papers as well as working efficiency.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an interaction system for a distributed tangible user interface through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

While there have been described above the principles of the present invention in conjunction with a laser puncher for punching hole on tipping paper in a curved manner, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A laser puncher for punching holes on tipping paper in a curve manner under the drive of a transmission system, the laser puncher comprising:
   a panel,
   a light guiding cylinder,
   a laser connected with the light guiding cylinder, and
   at least one focusing optical head, wherein at least one driving motor is fixed on the panel, a screw shaft is connected with the driving shaft of the driving motor, a nut is connected with the screw shaft and fixedly connected with one end of a connecting rod, the other end of the connecting rod is fixedly connected with at least one moving optical cylinder, one end of the at least one moving optical cylinder is provided with the light guiding cylinder, and the other end of the at least one moving optical cylinder penetrates the panel to be fixedly connected with the focusing optical head, the external periphery of the at least one moving optical cylinder is provided with an anti-rotation linear bearing, which is fixed on the panel, and the at least one driving motor drives the at least one focusing optical head to reciprocate back and forth via the screw shaft, the nut and the connecting rod, and the at least one moving optical cylinder.

2. The laser puncher for punching holes on tipping paper in a curve manner according to claim 1, wherein the at least one focusing optical head is driven by the at least one driving motor to reciprocate back and forth.

3. The laser puncher for punching holes on tipping paper in a curve manner according to claim 1, wherein there are a plurality of focusing optical heads and a plurality of driving systems each of which synchronously drives a plurality of focusing optical heads to reciprocate back and forth.

4. The laser puncher for punching holes on tipping paper in a curve manner according to claim 1, wherein the driving motor refers to a servo motor or a stepper motor.

5. The laser puncher for punching holes on tipping paper in a curve manner according to claim 1, wherein the laser refers to a $CO_2$ laser.

* * * * *